United States Patent [19]

Aoshima et al.

[11] Patent Number: 4,909,628
[45] Date of Patent: Mar. 20, 1990

[54] OPTICAL HETERODYNE DETECTOR

[75] Inventors: Shinichiro Aoshima; Tamiki Takemori; Yutaka Tsuchiya, all of Shizuoka, Japan

[73] Assignee: Hamamatsu Photonics Kabushiki Kaisha, Shizuoka, Japan

[21] Appl. No.: 245,254

[22] Filed: Sep. 16, 1988

[30] Foreign Application Priority Data

Sep. 17, 1987 [JP] Japan .................. 62-233886

[51] Int. Cl.$^4$ .............................. G01B 9/02
[52] U.S. Cl. .................. 356/349; 250/213 VT
[58] Field of Search .............. 356/349; 250/213 VT

[56] References Cited

U.S. PATENT DOCUMENTS 4,718,761 1/1988 Tsuchiya ............... 250/213 VT X

Primary Examiner—Davis L. Willis
Assistant Examiner—Matthew W. Koren
Attorney, Agent, or Firm—Finnegan, Henderson, Farabow, Garrett and Dunner

[57] ABSTRACT

An optical heterodyne detector comprising means for causing two light beams to interfere with each other and producing interference light beams thereof, a streak camera for receiving the interference light beams and analyzing means for analyzing an output of the streak camera, thereby to detect a beat frequency of the two light beams.

4 Claims, 2 Drawing Sheets

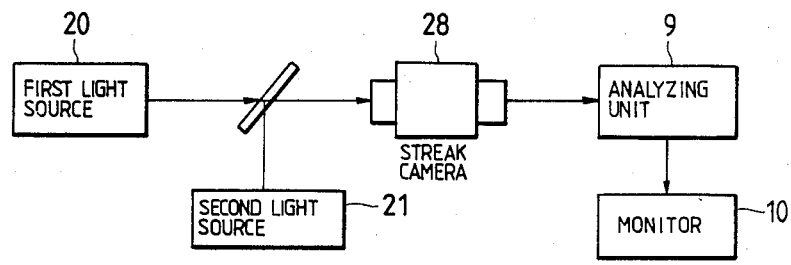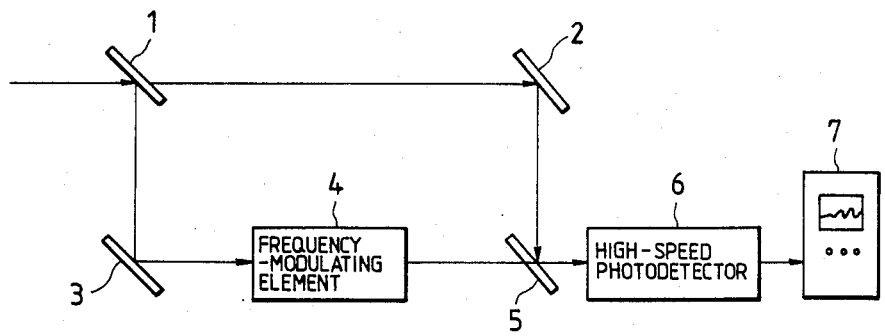

OPTICAL HETERODYNE DETECTOR

BACKGROUND OF THE INVENTION

This invention relates to an optical heterodyne detector for detecting the frequency difference between light beams which are greatly different from each other in frequency.

An optical heterodyne detector for detecting the modulation frequency of frequency-modulated light beam has been well known in the art.

The arrangement of the conventional optical heterodyne detector is outlined in FIG. 5. In FIG. 5, reference numeral 1 designates a beam splitter for splitting a laser beam applied thereto; 2 and 3, mirrors; 4, a frequency-modulating element; 5, a half mirror; 6, a high-speed photodetector comprising a PIN junction photodiode or the like; and 7, an oscilloscope or spectrum analyzer.

In the optical heterodyne detector shown in FIG. 5, the input laser beam is split into two light beams by the beam splitter 1. One of the two light beams is applied directly to the mirror 2, where it is reflected at right angles. The other light beam is reflected at right angles by the mirror 3 and applied to the frequency-modulating element 4 such as an acousto-optical element. In the frequency-modulating element 4, the input light beam is frequency-modulated. The output light beam of the frequency-modulating element 4 is applied to the half mirror 5. In the half mirror 5, the light beam not modulated which is applied thereto by means of the mirror 2 is combined with the light beam frequency-modulated which is applied thereto by means of the frequency-modulating element 4. The output light beam of the half mirror 5 is applied to the high-speed photodetector 6. In the photodetector 6, modulation frequency given to the frequency-modulated element 4 is detected as a beat frequency by interference. The signal thus detected is applied to the oscilloscope or spectrum analyzer 7 for observation of the modulation frequency.

In the above-described conventional optical heterodyne detector, the high-speed photodetector is combined with the oscilloscope or spectrum analyzer for detection and observation of the modulation frequency. Therefore, it is impossible for the detector to detect a high modulation frequency. Furthermore, with the optical heterodyne detector, the variation in intensity of a laser beam at a spatial point can be measured, but, in the case where components having different frequencies in space are provided in a one-dimensional direction, such one-dimensional spatial data cannot be measured with the optical heterodyne detector.

SUMMARY OF THE INVENTION

An object of this invention is to eliminate the above-described difficulties accompanying a conventional optical heterodyne detector. More specifically, an object of the invention is to provide an optical heterodyne detector which can time-analyze the one-dimensional spatial data of a laser beam, and can detect, even when the beam is shifted in position, the modulation frequency with high accuracy.

The foregoing object of the invention has been achieved by the provision of an optical heterodyne detector comprising: interfering means for causing first and second light beams to interfere with each other, streak camera means for receiving interference light beams from the interfering means and analyzing means for analyzing the output of the streak camera, so that the beat frequency of the first and second light beams is detected or the sign thereof (plus or minus) is determined.

In the optical heterodyne detector of the invention, the first and second light beams different in frequency being combined together by a half mirror, are caused to interfere with each other, and the streak camera and the analyzing means are used in combination to detect the beat frequency of the first and second light beams, and therefore the high time resolution of the streak camera can be used to detect the frequency difference of between light beams which are greatly different from each other in frequency, and even in the case where a laser beam includes components having different frequencies in space, the frequency difference in arbitrary space can be detected at the same time.

BRIEF DESCRIPTION OF THE DRAWINGS

FIG. 4 is an explanatory diagram for a description of an application of the optical heterodyne detector according to the invention; and FIG. 5 is an explanatory diagram showing the arrangement of a conventional optical heterodyne detector.

DETAILED DESCRIPTION OF THE INVENTION

A preferred embodiment of this invention will be described hereinunder with reference to the accompanying drawings.

Figure 1:
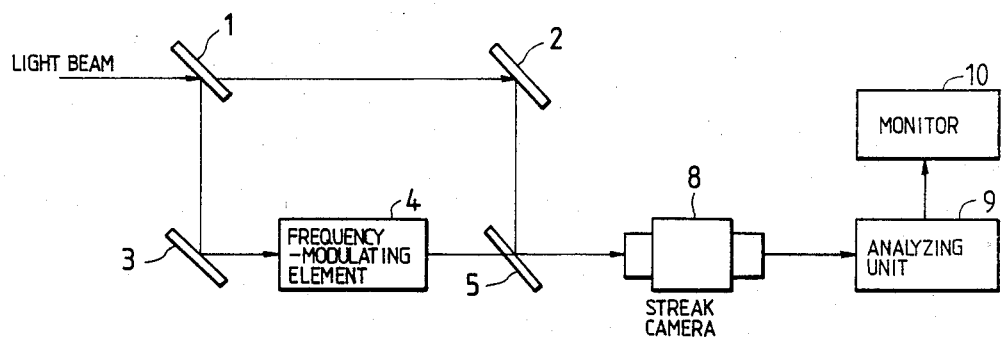
FIG. 1 is an explanatory diagram showing the fundamental arrangement of an optical heterodyne detector according to this invention.

First, the fundamental arrangement of an optical heterodyne detector according to the invention will be described with reference to FIG. 1. In FIG. 1, reference numeral 1 designates a beam splitter for splitting a laser beam into two light beams advancing in two different directions; 2 and 3, mirrors; 4, a frequency-modulating element in which a frequency to be measured is $f_0$; 5, a half mirror; 8, a streak camera; 9, an analyzing unit; and 10, a monitor.

The streak camera and its streak tube will be described with reference to FIGS. 2 and 3, respectively.

Figure 2:
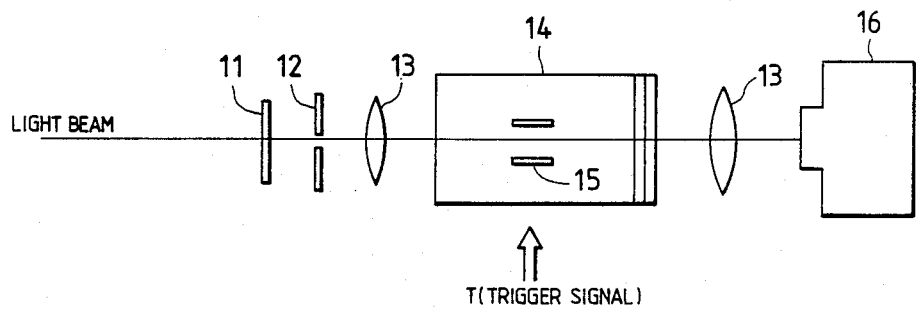
FIG. 2 is an explanatory diagram showing the arrangement of a streak camera in the optical heterodyne detector as shown in FIG. 1.

FIG. 2 is an explanatory diagram for showing the arrangement of the streak camera. In FIG. 2, reference character T designates a trigger signal; 11, a filter; 12, a slit; 13, a lens; 14, the streak tube; 15, the deflecting plates of the streak tube; and 16, a two-dimensional image pickup device such as a television camera, a CCD camera, an SIT camera or the like.

In the streak camera, the incident light beam is converted into a photoelectron beam, and a high speed sweeping operation is carried out with the photoelectron beam, so that the intensity of the incident light beam which changes with time is measured as the variation of luminance with position on the phosphor screen.

A laser beam is applied through the slit 12 and the lens 13 to the streak tube 14. The trigger signal T controls the deflecting plates of the streak tube 14 in synchronization with the incident light beam. The photoelectron beam formed by conversion of the light beam applied to the streak tube through the lens 13 is swept with the deflecting plates controlled by the trigger signal T, thus reaching the phosphor screen of the streak tube, so that the instantaneous optical intensity is displayed on the phosphor screen. The displayed image is projected through the lens 13 onto the two-dimensional image pickup device 16 such as a television camera, a CCD camera, an SIT camera or the like, the output signal of which is applied to the analyzing unit.

The arrangement and the operating principle of a streak tube will be described with reference to FIG. 3.

Figure 3:
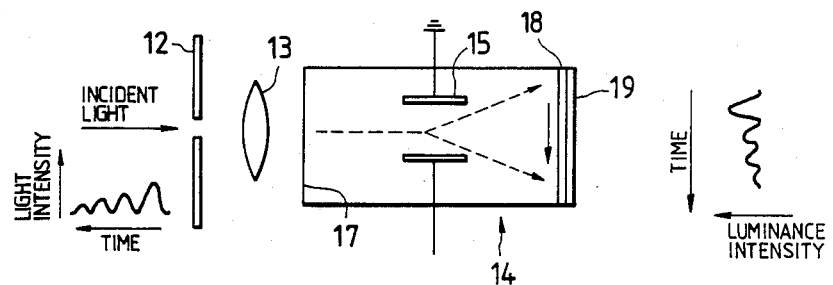
FIG. 3 is an explanatory diagram for a description of the arrangement of a streak tube in the streak camera.

In FIG. 3, reference numeral 12 designates a slit plate; 13, a lens; 14, a streak tube; 15, deflecting plates; 17, a photocathode; 18, a microchannel plate (MCP); and 19, a phosphor screen.

A light beam to be measured (incident light beam) is applied through the slit plate 12 and the lens 13 constituting an incident optical system to the streak camera 14, so that it is imaged as a slit image, on the photocathode 17 of the streak camera 14. The photocathode 17 is to convert an incident light beam into a photoelectron beam. The slit image is converted into an electron image by the photocathode 17, and the electron image is accelerated and applied to the MCP 18. When, in this operation, the electron image passes through the deflecting plates 15, it is deflected downwardly at high speed, thus reaching the MCP 18. The sweep timing should be in synchronization with the electron image passing through a space between the deflecting plates. Therefore in the case where the light beam to be measured is a pulse light beam, a part of an incident light beam or exciting light beam split is received by a photo-electric detector such as a photodiode or the like, and the electrical signal outputted by the photo-electric detector is employed as a trigger signal. The electron image is amplified by the MCP 18, and converted into an optical image, namely, a streak image by the phosphor screen. The streak image is luminance data with the lapse of time plotted on the vertical (time) axis of the phosphor screen. The positional (spatial) data, in the direction of horizontal axis, of the incident light beam are provided on the horizontal axis (in the direction of the slit) of the streak image. When the data on the horizontal axis are converted into wavelengths with a spectroscope, the variation with time of the optical intensity of each wavelength can be measured. Furthermore, according to the wavelength, the frequency conversion can be achieved.

The optical heterodyne detector with the streak camera having the above-described streak tube will be described, referring back to FIG. 1.

In FIG. 1, an incident laser beam is split into two light beams by the beam splitter 1. One of the two light beams is applied, as a first light beam, to the half mirror 5 with the aid of the mirror 2; whereas the other is applied to the frequency-modulating element 4 with the aid of the mirror 3, where it is modulated with a given frequency. The output of the frequency-modulating element 4 is applied, as a second light beam, to the half mirror 5. In the half mirror 5, the first and second light beams are combined together. The output light beam of the half mirror 5 is applied to the streak camera 8, where the intensity of the incident light beam is measured as the variation of luminance with position on the screen. The variation of the streak image is analyzed by the analyzing unit 9, so that the frequency-to-be-measured $f_0$ of the frequency-modulating element is detected.

In the case where a steady signal is applied to the frequency-modulating element, the trigger signal can be applied externally with optional timing. In the case where a signal is applied intermittently to the frequency-modulating element, it is necessary to form a trigger signal from the signal thus applied, for the timing of operation.

With the detecting means, the measurement can be made up to about 200 GHz.

As examples of the application of the invention based on the above-described principle, (i) measurement of the frequency difference between two light sources and (ii) measurement of an optional frequency will be described with reference to FIG. 4:

(i) Measurement of the frequency difference between two light sources:

In FIG. 4, reference numeral 20 designates a first light source having a frequency $f_1$; 21, a second light source having a frequency $f_2$; and 28, 9 and 10, a streak camera, analyzing unit, and monitor, respectively, which are the same as those in FIG. 1.

The light beam having the frequency $f_1$ outputted by the first light source 20 and the light beam having the frequency $f_2$ outputted by the second light source 21 are applied to the beam splitter 1, whereby they are combined together. The light beams thus combined are applied to the streak camera, and are detected, as the beat frequency thereof, with the aid of the analyzing unit 9. As a result, the frequency difference between the two light beams is detected. For instance in the case of an He-Ne laser, with the device according to this invention, frequency differences of up to about 0.05% can be measured because the frequency of the He-Ne laser is $4.74 \times 10^{14}$ Hz.

(ii) Measurement of an optional frequency:

In the above-described measurement (i), the frequency of the first light source 20 is employed as a reference frequency $f_1$, and a light source having a frequency $f_n$ to be measured is employed as the second light source 21. When a beat frequency $f_0$ is measured according to the invention, the optical frequency $f_n$ of the light source 21 to be measured can be obtained from the following equation:

$$f_n = f_1 \pm f_0$$

Further, the sign of the beat frequency is determined on the basis of an optical arrangement of the first and second light sources in which light beams from the first and second light sources interfer with each other, and the change of one-dimensional spatial information with respect to time.

As was described above, in the case of the conventional optical heterodyne detector shown in FIG. 5, the frequency difference detected is not higher than 1 GHz. On the other hand, with the optical heterodyne detector using the streak camera according to the invention, the separation can be made up to about 200 GHz; that is, a frequency difference 200 times as high can be detected. Furthermore, use of the streak camera permits the time analysis of one-dimensional spatial data and determination of the sign of a beat frequency, and therefore even when the beam is shifted in position, the detection can be achieved with high accuracy, and the measurement accuracy can be improved by subjecting the interference fringes to time analysis as they are.

What is claimed is:

1. An optical heterodyne detector comprising:

interfering means for causing first and second light beams to interfere with each other to produce an interference beam;

streak camera means for receiving said interference light beam from said interfering means and converting a change of intensity of said interference light beam with time to a variation of luminance with space; and analyzing means for analyzing an output of said streak camera means to detect a beat frequency of said first and second light beams.

2. An optical heterodyne detector as claimed in claim 1 wherein said interfering means comprises a half mirror.

3. An optical heterodyne detector as claimed in claim 1, further comprising a beam splitter for splitting a laser light beam into said first and second light beams.

4. An optical heterodyne detector as claimed in claim 1, further comprising a first light source for producing the first light beam, said first light beam having a reference frequency, and a second light source for producing the second light beam, said second light beam having a frequency to be measured.

* * * * *